No. 773,430.                                               Patented October 25, 1904.

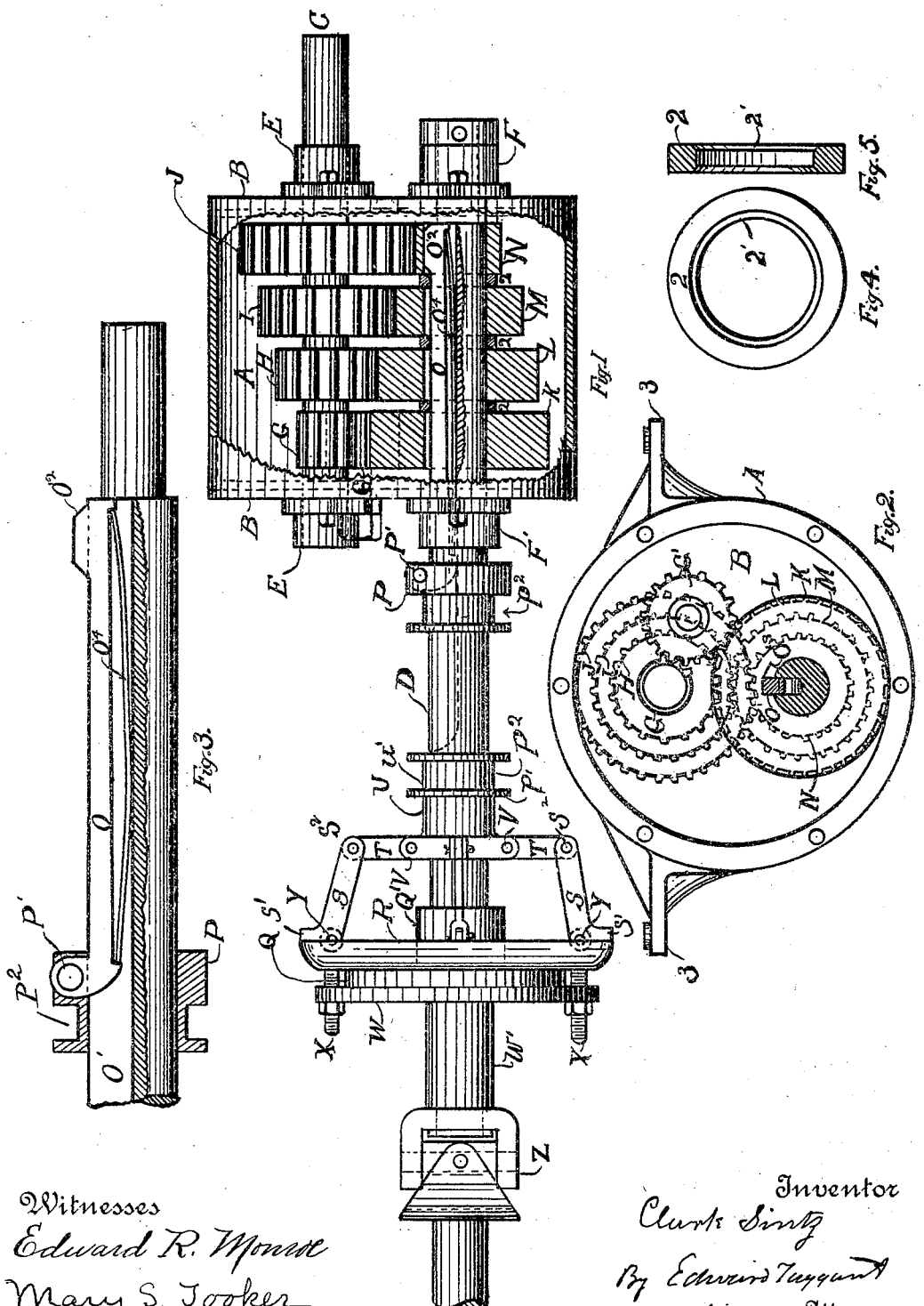

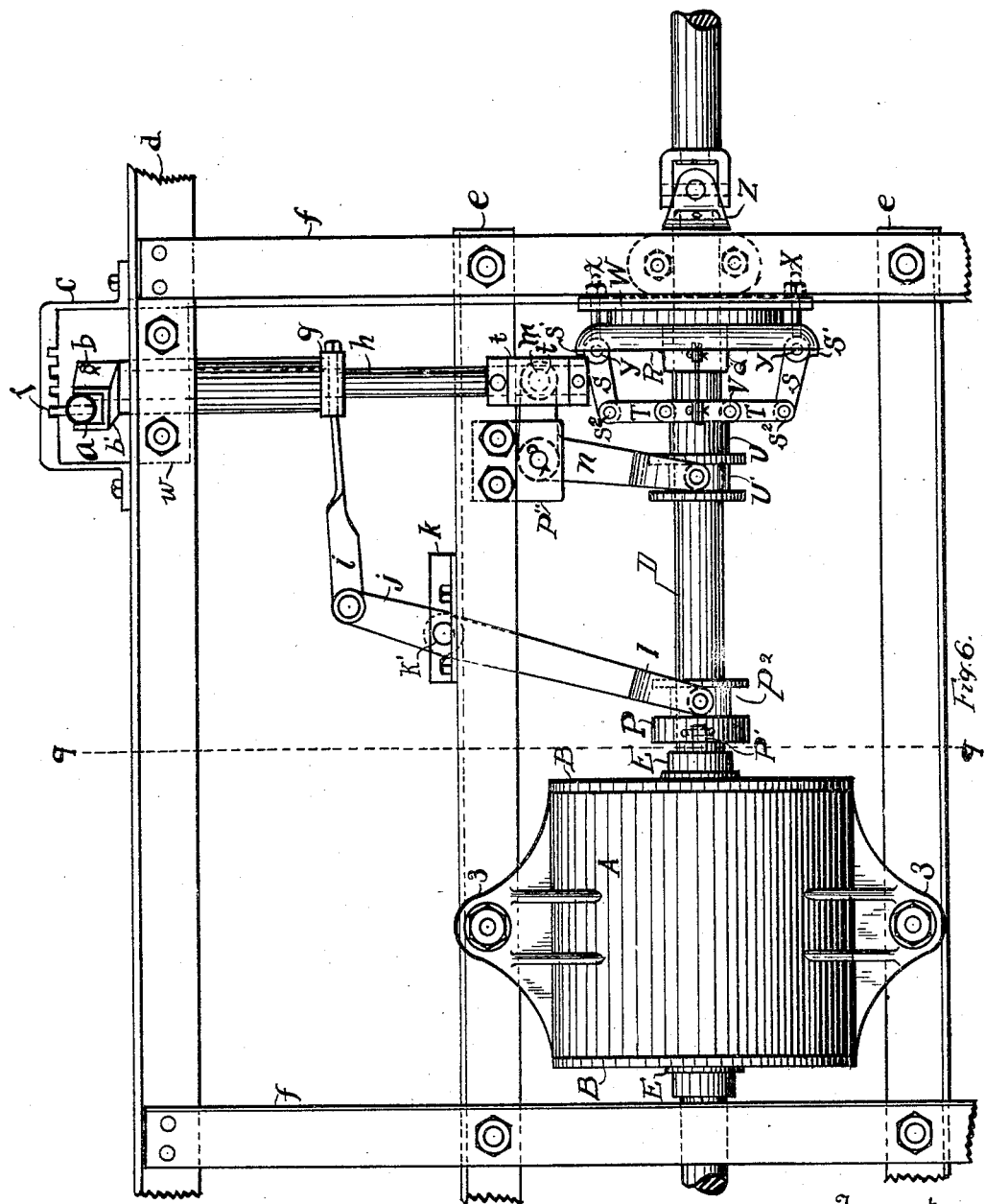

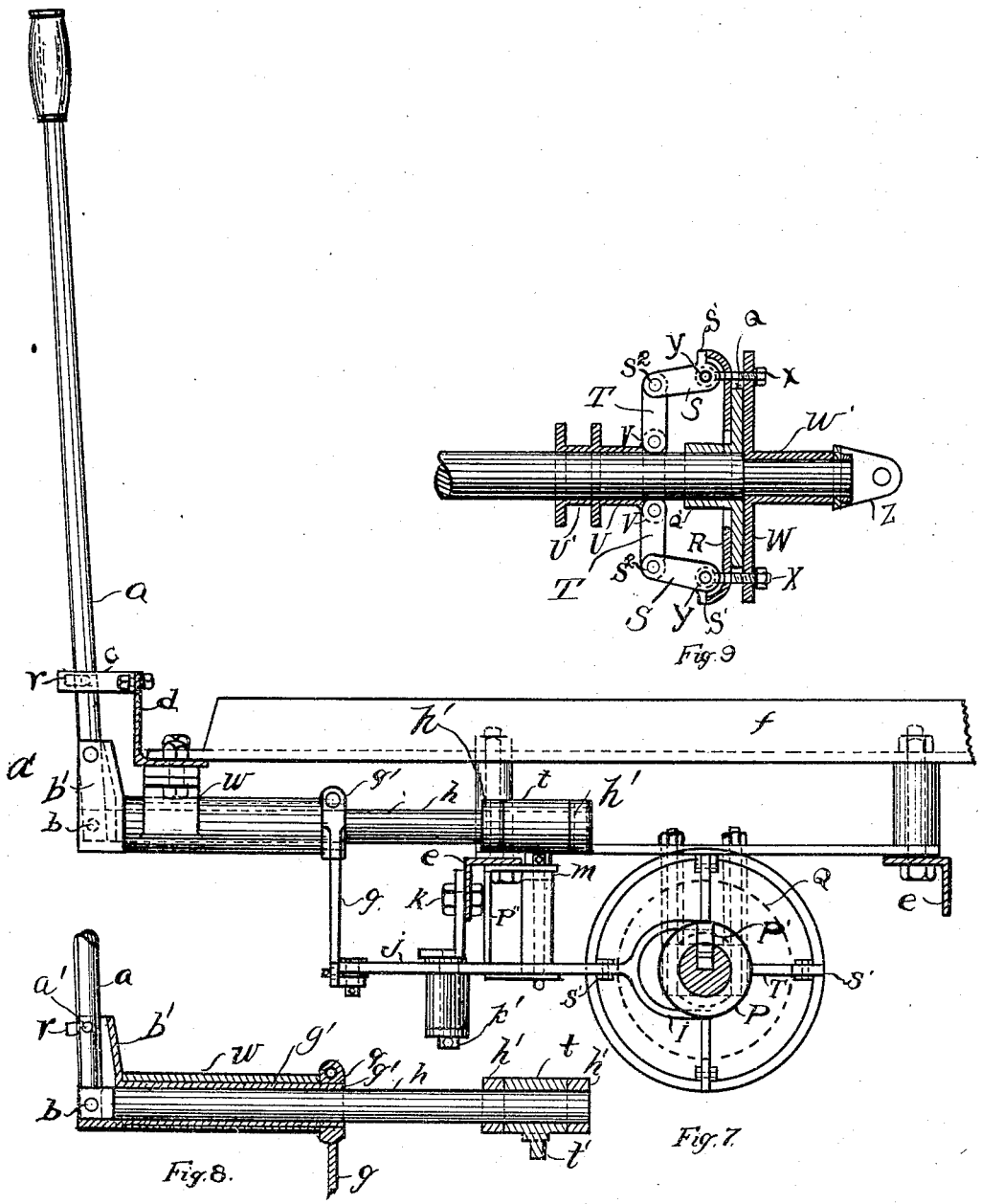

UNITED STATES PATENT OFFICE.

CLARK SINTZ, OF GRAND RAPIDS, MICHIGAN.

POWER-TRANSMISSION MECHANISM.

SPECIFICATION forming part of Letters Patent No. 773,430, dated October 25, 1904.

Application filed January 26, 1903. Serial No. 140,659. (No model.)

*To all whom it may concern:*

Be it known that I, CLARK SINTZ, a citizen of the United States, residing at Grand Rapids, in the county of Kent and State of Michigan, have invented new and useful Improvements in Power-Transmission Mechanism, of which the following is a specification.

This invention relates to certain new and useful improvements in power-transmission mechanism adapted for use in connection with automobiles and analogous purposes where it is desirable to change the speed of a given part of machinery, also for reversing the movement.

The invention consists in the combination and arrangement of parts hereinafter described.

The objects of the invention are, first, to furnish an efficient and durable mechanism for changing the speed between two revolving shafts by means of suitable gearing; second, to reverse the movement of the shaft which is used to convey power to the driven mechanism; third, to so connect a single lever to the mechanism for changing the speed and to the clutch device for separating the power from the machinery to be operated that both the speed mechanism and the clutch mechanism can be operated by the same lever; fourth, to furnish a novel lever-and-clutch mechanism whereby the driven mechanism may be attached and detached from the motor-power; fifth, other objects hereinafter pointed out and described. These objects I accomplish by means of the mechanism illustrated in the accompanying drawings, in which—

Figure 1 shows a side elevation of the transmission-gear with one side of the gear-casing cut away in order to show the gearing for producing the slow, medium, and rapid speed. Fig. 2 is an end view of the gear looking to the right of Fig. 1 with one of the heads of the case removed. Fig. 3 is a view of the driven shaft with a part cut away to show the position of the key used for locking the pinions, respectively, to the driven shaft. Fig. 4 is an end view of one of the dividing-collars which separates the pinions on the driven shaft. Fig. 5 is a sectional view through the center of said collar. Fig. 6 is a plan view of the transmission-gear and the operating mechanism that transmit the power from the engine to the axle, also of the lever mechanism. Fig. 7 is a sectional view of Fig. 6 on the line $q$ $q$ looking to the right. Fig. 8 is a section of the operating lever and shaft. Fig. 9 is a sectional view of the friction-clutch and attached mechanism.

Similar characters refer to similar parts throughout the several views.

A represents the gear-casing which incloses the gearing between the driving-shaft and the driven shaft. The heads of this casing are shown by B B.

C represents the driving-shaft, which is connected by any suitable means to the motor-power, whatever such motor-power may be.

D represents a shaft which is driven by the gear mechanism hereinafter described. The motion is conveyed through this shaft D to the axle of an automobile when the mechanism is applied to automobiles or to other machinery when the mechanism is not applied to automobiles.

E E represent the journal-boxes for the shaft C, and F F represent journal-boxes for the shaft D.

G is a pinion upon the shaft C, which engages with the intermediate gear G' G', acting as an idler for the purpose of conveying the motion from the pinion G to the pinion K, as hereinafter described.

H is the slow-speed pinion, which revolves with the shaft C and which engages with the gear-wheel L upon the shaft D.

I is a medium-speed pinion or gear revolving with the shaft C and engaging with the pinion N on the shaft D.

J is a high-speed gear revolving with the shaft C and engaging with the pinion N on the driving-shaft D.

The gear K and the pinions G and G' are used for the purpose of giving a reverse movement to the shaft D, as hereinafter described. The gears K, L, M, and N are carried by the shaft D so as to revolve either with the shaft or without the shaft, as may be required.

O is a sliding key sliding in the keyways $O^3$ and provided with a projection $O^2$, the projection $O^2$ being adapted to extend into keyways in the gear wheels or pinions K, L, M, and N, respectively. The positions of these keyways are shown in Figs. 1 and 2. Lying back or beneath the sliding key O is the spring $O^4$, which presses the projection $O^2$ of the key O outwardly, so as to cause the same to engage with the keyways in the gearing, the key O having a longitudinal movement by means of suitable mechanism, so as to cause the projection $O^2$ to successively key the pinions K, L, M, and N to the shaft D, the construction being such, however, that but one of the said pinions can be keyed to the shaft D at the same time.

P is a sliding collar on the shaft D and suitably connected to the key O by means of the pin P'.

$P^2$ is a groove in the sliding collar P, which is used to give the sliding motion to the collar P and the key O for the purpose of engaging and disengaging the gears from the shaft, as hereinafter described.

Q is a flange on the hub Q', said flange and hub being rigidly connected to the shaft D.

R is a collar working freely on the hub Q' and is connected to the flange W by means of the eyebolts X X, as shown in Figs. 1 and 9.

S S are pivoted levers connected to the eyebolts X X by means of the pins Y Y. $S^2$ $S^2$ are pivots connecting said levers to the links T T.

T T are links connecting the levers S S with the lugs V V on the collar U.

U is a sliding collar on the shaft D for operating the links T T.

U' is a groove in the collar U with which the lever $n$ engages.

S' and S' are projections or lugs on the levers S S.

W is the flange which forms a part of the friction-clutch, and W' is a collar connected at one end with the flange W and at the other end with the knuckle-joint Z, which knuckle-joint Z forms what is called a "universal coupling." The separating-collars are shown by 2, said separating-collars being used for separating on the shaft D the gears K, L, M, and N. Each collar is provided with a beveled edge at its opening, as shown by 2'.

3 3 are lugs for bolting the case to any suitable framework.

The collar U is operated by any suitable mechanism, my preferred form of mechanism being hereinafter described.

$a$ is the operating-lever for operating the sleeve $g'$ in changing the speed and also for operating the clutch which connects the driven shaft to the axle.

$a'$ is a pivot or bolt connecting the lever $a$ with the arm or lug $b'$ on the sleeve $g'$.

$b$ is a pivotal pin connecting the lever $a$ with the sliding shaft $h$.

$b'$ is a lever-arm on the sleeve $g'$.

$c$ is a quadrant-rack provided with notches or cogs and adapted to secure the lever $a$ in any required position within the rack.

$d$ represents the angle-iron frame of a car or automobile.

$e$ is an angle-iron subframe for supporting the engine and connected mechanism.

$f$ is a cross-frame of a car which supports the angle-frame $e$.

$g$ is a lever connecting the sleeve $g'$ to the lever $i$.

$g'$ is a rotating sleeve carrying the operative lever $a$ at one end and secured to the lever $g$ at the other end.

$h$ is the shifting rod, which is connected at one end to the lever $a$ by means of the pin $b$ and at the other end to the loose collar $t$. This rod $h$ has a longitudinal motion conveying the power through the bell-crank levers $m$ $n$ to the collar U, and thereby to the clutch device which connects and disconnects the shaft D with and from the axle.

$h'$ and $h'$ are collars secured to the rod $h$ on either side of the collar $t$, as shown in Fig. 8.

$i$ is a rod connecting the lever $g$ with the lever $j$.

$j$ is a lever for operating the sliding collar P.

$k$ is a bracket to which the lever $j$ is pivoted.

$k'$ is a pin rigidly connected to $k$ and forming a fulcrum to the lever $j$.

$l$ is the forked end of the lever $j$, which engages in the groove $P^2$ of the collar P.

$m$ is the short arm of the lever $n$, $n$ being the lever for operating the friction-clutch through the sliding sleeve U.

$r$ is a lug on the lever $a$ which engages the notches in the quadrant $c$.

$t$ is a collar on the rod $h$, having a projecting lug $t'$, the projecting lug $t'$ engaging in the end $m$ of said lever $n$.

The operation of my invention is as follows: The power is applied to the shaft C by means of a motor, engine, or other suitable means. When it is in the high-speed position, the projection $O^2$ of the key O is engaged in the keyway of the pinion N, and this pinion N is then in engagement with the gear J, thereby revolving the shaft D. If the clutch connecting the shaft D to the shaft W' is closed, it will give the required motion to the axles of the automobile or other mechanism to which the same is attached. In order to loosen the clutch, the lever $a$ is moved laterally, withdrawing the lug $r$ from its notch in the quadrant, giving a longitudinal motion to the rod $h$, turning the bell-crank $n$ upon its fulcrum and opening the clutch by means of the connection between the forked end of the lever $n$ and the collar U, as shown in Figs. 6 and 7, moving the sliding collar U, which carries the links T, toward the hub of the clutch, thus drawing the outer ends of the levers S S toward the shaft, which removes the ends S' S' of these levers away from the clutch, thereby relieving the clutch, so that the shaft D will revolve without revolving the shaft W' or the axle.

The changes of speed are produced in the following manner: The upper end of the lever $a$ is shifted, (see Fig. 6,) the lug $r$ being withdrawn from the quadrant $c$. This moves the lever $g$ to the left. The lever $g$ is connected, by means of the rod $i$, to the short end of the forked lever $j$, which moves the forked longer end of the lever $j$ to the right. The forked end of the lever $j$ engages with the groove $P^2$ of the sliding collar P. This being attached to the sliding key O draws the key O, so as to move the projection $O^2$, the same being pressed down as it passes through the collars, and after the said projection $O^2$ passes the collars 2 the spring $O^4$, pressing downwardly upon the key, causes the projection $O^2$ to be engaged in the keyway of the gear M. This causes M and the shaft D to be revolved by means of its connection with the gear I. In changing from a medium speed to a slow speed the part $O^2$ of the key O is moved until the gear L on the shaft D is keyed to the shaft, and it and the shaft are now revolved by the medium-speed pinion H. To reverse the motion of the shaft D, the key O is carried until the projection $O^2$ keys the pinion or gear K to the shaft D, and the pinion K, being in engagement with the idler-pinion G', now receives its motion through engagement with the pinion G, the intermediate pinion G' thereby giving a reverse motion to the gear K and the shaft D.

Before changing from one speed to another, as well as before changing the motion of the driven shaft, the friction-clutch must be loosened, which is done by sliding the lever $a$, as above described, and at the same time the lug $r$ is released from its notch in the quadrant.

It will be seen that it is necessary to move the lever $a$ so as to withdraw the lug $r$ from the notch in the quadrant $c$ and to open the clutch mechanism before the change can be made from one speed to another and before reverse motion can be given.

Having thus described my invention, what I claim to have invented, and desire to secure by Letters Patent, is—

1. In combination with the driven shaft of a power-transmission mechanism, a series of driven gears thereon, a clutch device for connecting and disconnecting the said shaft with any suitable mechanism to be operated, a sliding key for separately keying to the driven shaft the gears for revolving said shaft, a lever and suitable mechanism for connecting said lever to the speed-changing mechanism and said clutch, whereby the clutch and the speed-changing mechanism are operated from the same operating-lever.

2. The combination of an operating-lever, a speed-changing mechanism, suitable connection between said operating-lever and said speed-shifting mechanism, operated by a movement in one plane of said lever, a clutch device between the motor-power and the driven mechanism, suitable connection between the clutch device and said operating-lever, operated by a movement in a different plane of said lever, whereby the clutch mechanism is operated by one movement of the lever and the shifting mechanism and by a different movement of the lever, and a suitable locking device for retaining the lever in any required position.

3. In a power-transmitting mechanism, an operating-lever, a rack with which such lever engages, a shifting mechanism and a clutch mechanism, suitable mechanism between the said lever and said shifting mechanism operated by a movement in one plane of said lever, and suitable connection between said lever and said clutch mechanism operated by a movement in a different plane of said lever, substantially as described.

In testimony whereof I have hereunto set my hand in presence of two subscribing witnesses.

CLARK SINTZ.

Witnesses:
ARTHUR C. DENISON,
EDWARD TAGGART.